United States Patent [19]
Davis, Jr.

[11] Patent Number: 5,425,046
[45] Date of Patent: Jun. 13, 1995

[54] OPTICAL COLLIMATING/POLARIZING DEVICE, METHOD OF MAKING SAME AND FREQUENCY STABILIZED LASER USING SAME

[75] Inventor: Claude L. Davis, Jr., Painted Post, N.Y.

[73] Assignee: Corning Incorporated, Corning, N.Y.

[21] Appl. No.: 896,977

[22] Filed: Jun. 11, 1992

[51] Int. Cl.$^6$ .............. H01S 3/08; C03C 15/00
[52] U.S. Cl. ................... 372/106; 372/32; 372/55; 372/101; 372/105; 65/30.1; 359/497; 359/498
[58] Field of Search ............ 372/29, 30, 32, 25, 372/106, 55, 66, 68, 98, 99, 101, 105, 107, 108, 18; 65/30.1, 30.11, 30.13, 32.4, 32.5; 385/11, 14, 33, 34, 141; 359/483, 494, 498, 497

[56] References Cited

U.S. PATENT DOCUMENTS

| | | | |
|---|---|---|---|
| 3,526,850 | 9/1970 | Dillon, Jr. et al. | 372/106 X |
| 3,875,529 | 4/1975 | Hintz | 372/106 |
| 4,304,584 | 12/1981 | Borrelli et al. | 65/30 |
| 4,461,009 | 7/1984 | Lundstrom | 372/108 |
| 4,479,819 | 10/1984 | Borrelli et al. | 30/ |
| 4,549,795 | 10/1985 | Simms | 351/163 |
| 4,672,618 | 6/1987 | Wijntjes et al. | 372/32 |
| 4,809,293 | 2/1989 | DeBell et al. | 372/106 X |
| 4,875,220 | 10/1989 | Krueger et al. | 372/106 X |
| 4,908,054 | 3/1990 | Jones et al. | 65/30 |
| 4,923,758 | 5/1990 | Marks et al. | 428/437 |
| 4,977,028 | 12/1990 | Goepfert et al. | 428/426 |
| 5,022,034 | 6/1991 | May et al. | 372/26 |
| 5,027,365 | 6/1991 | Anderson | 372/106 X |
| 5,132,978 | 7/1992 | Marshall | 372/106 X |
| 5,142,548 | 8/1992 | Krasinski et al. | 372/106 X |

FOREIGN PATENT DOCUMENTS 1-210907  8/1989  Japan .............. 385/11 X

Primary Examiner—Brian Healy
Attorney, Agent, or Firm—Milton M. Peterson; Clinton S. Janes, Jr.

[57] ABSTRACT

An integral optical train comprising a plurality of optical components including a polarized glass element and a light-altering optical element. The polarized glass element may be a glass containing elongated particles of a silver halide selected from the group consisting of AgCl, AgBr and AgI, and the optical element may be a lens or a mirror.

13 Claims, 1 Drawing Sheet

OPTICAL COLLIMATING/POLARIZING DEVICE, METHOD OF MAKING SAME AND FREQUENCY STABILIZED LASER USING SAME

FIELD OF THE INVENTION

The field is optical instruments and systems involving components for polarizing and altering light rays.

BACKGROUND OF THE INVENTION

Materials capable of polarizing light have been commercially available for many years. The best known application is in the ophthalmic area, namely, sunglasses. It is common practice to produce a polarizing element by dispersing a second phase in an organic plastic matrix. The plastic element might be adhered to, or sandwiched between, glass elements to provide scratch resistance.

Many optical instruments embody an optical train, that is a plurality of components. Frequently, such a train requires means for polarizing light rays, referred to as a polarizer, and also means for modifying or altering the light rays, such as a lens or mirror. The components in an optical train may be completely separate elements mechanically arranged or mounted in an operating instrument or system. Such a system tends to be bulky and inconvenient to use.

Alternatively, the components may be bonded or adhered together. For example, a layer of polarizing plastic material may be adhesively bonded to a glass lens. In such an arrangement, chemical durability and delamination problems may be encountered, particularly if the composite is exposed to temperature extremes and/or high humidity. Organic materials, whether employed as a component or as an adhesive, cannot, of course, withstand elevated temperatures.

In summary, there is currently no integral, that is single body, polarizing lens, either in glass or in plastic. Rather, it is common practice to fabricate a lens from either organic or glass material. Then a layer of polarizing plastic is bonded to a surface of the lens.

It has been recognized that various advantages would accrue from an integral structure. These include, a. An integral body could be more compact, and hence easier to handle and use.
b. Problems of delamination and chemical durability would be avoided.
c. Multiple interfaces having differing refractive indices, whereby light is lost during transmission, would be reduced.

It is therefore a primary purpose of the present invention to provide an integral body that will deliver both polarizing and light altering properties. Another purpose is to provide an integral body embodying both a polarizer and a light altering element, such as a lens or mirror. A further purpose is to provide an optical system or instrument incorporating such an integral body.

SUMMARY OF THE INVENTION

One aspect of my invention contemplates an optical train comprising a plurality of optical components, including at least one polarized glass element and a light-altering optical element, combined in an integral structure.

Another aspect of my invention is a method comprising the steps of forming a glass blank from a polarizable glass, finishing the blank to form an optical element and thereafter imparting polarizing characteristics to the glass optical element.

PRIOR ART

U.S. Pat. No. 4,304,584 (Borrelli et al.) describes a method of producing a polarized glass from a phase-separable, silver-containing glass, or from a photochromic glass containing a silver halide, by (a) elongating the glass under stress to elongate and align the separated glass phase or silver halide and (b) heat treating the elongated glass in a reducing environment.

U.S. Pat. No. 4,479,819 (Borrelli et al.) describes producing polarized glass by elongating and heat treating glass containing silver halide particles.

U.S. Pat. No. 4,549,795 (Simms) describes producing polarized ophthalmic glass lenses by reducing a metal oxide to a metal, for example lead, in a glass sheet, and then stretching the glass sheet to elongate and align the metal particles.

U.S. Pat. No. 4,908,054 (Jones et al.) describes a method of imparting polarizing properties in the infrared region to a glass containing silver halide particles. The glass is elongated and reduced.

S.N. 07/714,622, filed Jun. 13, 1991 in the names of N. F. Borrelli and T. P. Seward, III and assigned to the assignee of the present application, bending, discloses a birefringent waveplate, composed of an integral, transparent, glass body having a dispersed phase composed of particles, and optical systems embodying such waveplates.

DESCRIPTION OF THE INVENTION

The present invention provides an optical train that unites a polarizer and a light-altering optical element in an integral body. The resulting integral train may be incorporated in a variety of optical instruments and systems which function by polarizing and altering a light beam. Heretofore, such systems and instruments have frequently utilized a polarizer and a light-altering element, e.g. a lens or mirror, as separate and distinct components.

The invention preferably employs the infrared polarizing glasses described and characterized in U.S. Pat. No. 4,479,819 (Borrelli et al.). These glasses exhibit excellent polarization in the infrared portion of the spectrum. The effective polarizing ingredient in these glasses is elongated particles of one or more silver halides selected from AgCl, AgBr and AgI. The patent is incorporated herein in its entirety by reference.

A glass body formed from a melt, the batch for which employed precursors for the desired silver halides, may be rendered polarizing by, a. subjecting the glass body to a heat treatment at a temperature at least above the glass strain point, but not in excess of 50° C. above the glass softening point for a period of time sufficient to cause generation of silver halide particles ranging in size between 200-5000 Å;

b. elongating the glass body under stress at temperatures above the annealing point of the glass, but below a temperature at which the glass exhibits a viscosity of about $10^8$ poises, the particles being elongated to an aspect ratio of at least 5:1; and c. exposing the elongated glass body to a reducing environment at temperatures between 250° C. and about 25° C. above the glass annealing point, thereby reducing the silver halide to metallic silver which is deposited in and/or upon the elongated particles.

It is important to note that a polarizable glass body will be rendered polarizing after optical surfaces are finished on the body. This is important so that no glass is removed after the polarizing treatment. Consequently, consistent polarizing properties exist across the dimensions of the body.

Where a polarizing glass in the visible portion of the spectrum is required, an elongated glass, such as described in the Simms patent or the Borrelli et al. —584 patent, may be used. Phase-separated glasses, e.g. borate glasses, are well known in the glass art.

The invention is further described with reference to the accompanying drawing showing illustrative applications.

Figure 1:
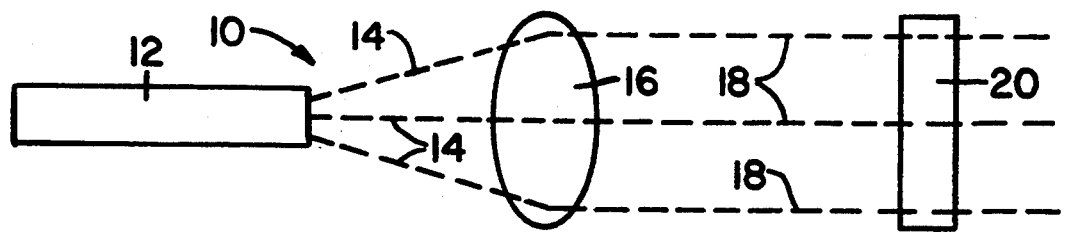
FIG. 1 is a schematic side view of a simple prior art optical train.

FIG. 1 is a schematic side view showing a simple form of optical train, generally designated 10, as heretofore known in the art.

Optical train 10 has a light source 12 which provides typical diverging light rays 14. Glass lens 16 is a bi-convex lens, known as a collimating lens. The surfaces of curvature on lens 16 are such as to bend diverging light rays 14 into parallel rays 18 (that is, a collimated beam) which then enter polarizer 20 and are polarized.

Figure 2:
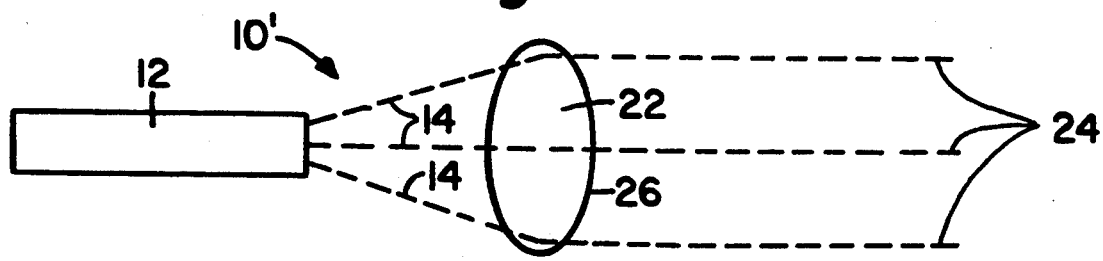
FIG. 2 is a schematic side view of the optical train of FIG. 1 as produced in accordance with the present invention.

FIG. 2 is a schematic side view showing an optical train 10' which corresponds functionally to optical train 10 of FIG. 1, but is constructed in accordance with the present invention. Optical train 10' has a light source 12 from which emanate diverging rays 14 as in FIG. 1. Diverging rays 14 pass into a composite lens member 22. Lens member 22 is produced from a polarizable glass such as described in Borrelli et al. patent —819. It is molded and finished as a collimating lens essentially the same as lens 16 of FIG. 1. Thus, light rays 14 are bent to parallel or collimated rays 24 as in FIG. 1. However, after being finished to form a collimating lens, lens 22 is then given a treatment to render at least its rear surface 26 polarizing. Therefore, rays 24 emanate from lens 22 not only collimated, but also polarized.

Thus, lens 22 is an integral glass body that performs the dual function of collimating and polarizing light rays 14. It integrates into a single body, no larger than former lens 16, the two components, lens 16 and polarizer 20, of FIG. 1.

Figure 3:
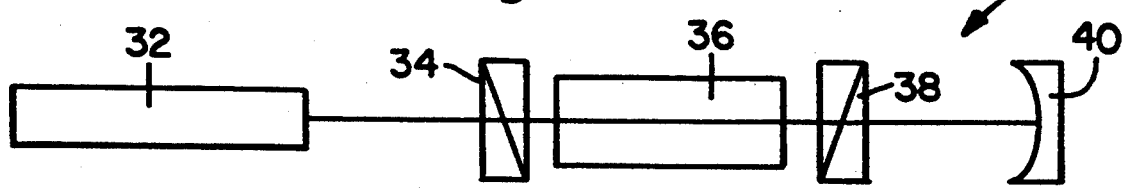
FIG. 3 is a schematic side view of an optical system in accordance with the prior art.

FIG. 3 is a schematic side view of a frequency stabilized laser assembly, generally designated 30, as heretofore known in the prior art. Laser assembly 30 comprises a laser 32, a polarizer 34, a gas tube 36, a second polarizer 38 and a mirror 40. It will be noted that this assembly embodies four components, in addition to the laser, which require mounting and alignment. Also, the assembly embodies eight reflection interfaces whereby considerable diminution of the laser beam occurs.

Figure 4:
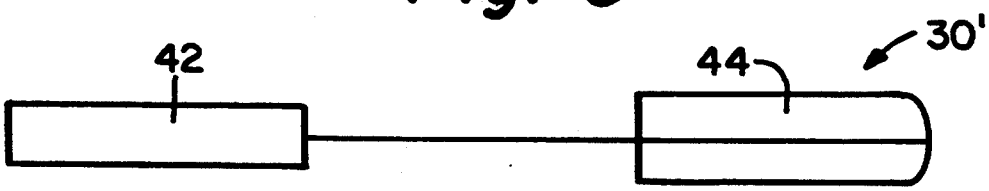
FIG. 4 is a schematic side view of the system of FIG. 3 as produced in accordance with the present invention.

FIG. 4 is a schematic side view of a laser assembly 30'. Assembly 30' corresponds functionally to assembly 30 of FIG. 3, but is constructed in accordance with the present invention. Laser assembly 30' comprises laser 42 which may be identical with 32. Assembly 30' further comprises composite body 44, an integral structure. Composite body 44 essentially represents a modification of gas tube 36 that incorporates the functions of polarizers 34 and 38 and mirror 40.

Figure 5:
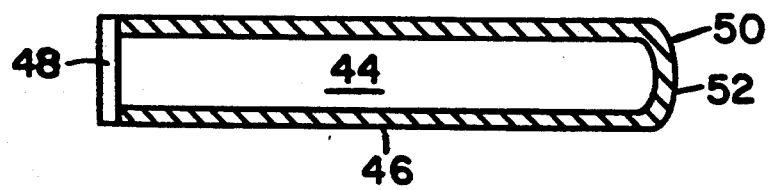
FIG. 5 is a side view in cross-section of an element in FIG. 4.

FIG. 5 is a side view in cross-section showing composite body 44 in greater detail for illustration. Composite body 44 may have a tubular section 46 and end windows 48 and 50. It is adapted to contain a particular gas being used, for example rubidium vapor.

Gas tube 36 in FIG. 3 is closed at either end by a plain glass window adapted to transmit the laser beam. The windows are fused or sealed to a central tubular section that essentially corresponds to tubular section 46.

Composite body 44 essentially differs from gas tube 36 in the windows at either end of tubular section 46. The usual plain windows of gas tube 36 are replaced by a special front window 48 and a special rear window 50. Windows 48 and 50 will be sealed to tubular section 46 to provide the usual gas-tight construction. This may involve direct fusion seals, frit glass seals, or a solder seal between metallized rims.

Windows 48 and 50 must, of course, be transparent to the laser beam. In addition, they are formed from a polarizing glass, such as that used in forming lens member 22 in FIG. 2. Front window 48 might be a plano-plano window if only polarization is desired. If a further function, such as light bending, is desired, window 48 might be ground to produce a surface, or surfaces, as desired. Rear window 50 may also be plano-plano, or may have a curvature imparted. As shown, it is given a convex outer surface, and a reflective coating 52 is applied. Coating 52 may be any reflective coating as well known in the mirror art. With coating 52 applied, window 50 then assumes the function of mirror 40, as well as that of polarizer 38. Effectively then, gas tube assembly 44 integrates separate and distinct components into one integral body. The reduction in size, the ease of assembly and use, and the simplicity of optical finishing are apparent. It is also worthy of note that eight reflection interfaces have been replaced by three.

Another interesting application is a polarizing ball lens wherein two components, a polarizer and a ball lens, are integrated into one. A polarizable glass blank is ground and polished to a spherical shape and thereafter subjected to a polarizing treatment. The integrated element may be used in certain optical isolator/couplers used with lasers.

It will be appreciated that the foregoing description is simply illustrative, and not limiting. While it represents the best mode of presently practicing the invention, it will be appreciated that numerous variations and other applications will be apparent to those familiar with the art.

I claim:

1. An optical train comprising a single glass body embodying at least one polarized glass element and a light-altering optical element, the polarized glass element being a glass containing elongated particles of a silver halide selected from the group consisting of at least one silver halide selected from the group consisting of AgCl, AgBr and AgI.

2. An optical train in accordance with claim 1 wherein the single glass body has the geometry of a lens.

3. An optical train in accordance with claim 2 wherein the lens is a collimating lens, 4. An optical train in accordance with claim 2 wherein the lens is a ball lens.

5. An optical train in accordance with claim 2 wherein the lens has a reflecting coating applied to a rear surface to provide a mirror, 6. An optical train in accordance with claim 1 comprising a tubular member having one end closed by a first polarizing glass element and the opposite end closed by a second polarizing glass element having the geometry of a lens.

7. An optical train in accordance with claim 6 wherein the second polarizing glass element has a reflecting coating applied thereto to produce a mirror.

8. In a frequency stabilized laser assembly, a gas tube comprising a tubular, single glass body having one end closed by a first polarizing glass element and the opposite end closed by a second polarizing glass element that has the geometry of a lens, at least one polarizing glass element containing elongated particles of a silver halide selected from the group consisting of at least one silver halide selected from the group consisting of AgCl, AgBr, and AgI.

9. A frequency stabilized laser assembly in accordance with claim 8 wherein the second polarizing glass element has a reflecting coating applied to its outer surface to produce a mirror.

10. A method of producing an all-glass body which comprises the steps of forming a glass body from a polarizable glass having the geometry of an optical dement and thereafter imparting polarizing characteristics to at least one surface of the optical element, the polarizable glass containing elongated particles of a silver halide selected from the group consisting of AgCl, AgBr and AgI.

11. A method in accordance with claim 10 wherein the glass blank is ground and polished to produce an optical surface thereon.

12. A method in accordance with claim 10 wherein polarizing characteristics are imparted by exposing the elongated glass particles to a reducing environment at temperatures between 250° C. and about 25° C. above the glass annealing point to reduce a portion of the silver halide to metallic silver.

13. An optical train in accordance with claim 1 that combines the functions of polarizing a light beam and altering the path of that light beam.

* * * * *